United States Patent
Wittig et al.

(10) Patent No.: US 10,247,289 B2
(45) Date of Patent: Apr. 2, 2019

(54) COMPONENT WITH INTERNAL AND EXTERNAL TEETH AND METHOD FOR MANUFACTURING COMPONENT

(71) Applicant: WEBO Werkzeugbau Oberschwaben GmbH, Amtzell (DE)

(72) Inventors: Axel Wittig, Roggenzell (DE); Anton Straub, Fronreute/ Blitzenreute (DE)

(73) Assignee: WEBO WERKZEUGBAU OBESCHWABEN GMBH, Amtzell (DE)

( * ) Notice: Subject to any disclaimer, the term of this patent is extended or adjusted under 35 U.S.C. 154(b) by 625 days.

(21) Appl. No.: 14/784,082

(22) PCT Filed: Mar. 22, 2014

(86) PCT No.: PCT/EP2014/000783
§ 371 (c)(1),
(2) Date: Oct. 13, 2015

(87) PCT Pub. No.: WO2014/166592
PCT Pub. Date: Oct. 16, 2014

(65) Prior Publication Data
US 2016/0047455 A1 Feb. 18, 2016

(30) Foreign Application Priority Data
Apr. 10, 2013 (DE) .................. 10 2013 006 150

(51) Int. Cl.
*B21K 1/30* (2006.01)
*F16H 55/17* (2006.01)
(Continued)

(52) U.S. Cl.
CPC ............. *F16H 55/17* (2013.01); *B21D 39/04* (2013.01); *B21D 53/28* (2013.01); *B23P 15/14* (2013.01);
(Continued)

(58) Field of Classification Search
CPC ........ B21D 17/04; B21D 53/28; B21D 39/04; B21H 1/20; B21H 5/02; B21H 5/025;
(Continued)

(56) References Cited

U.S. PATENT DOCUMENTS

| 4,116,032 A | * | 9/1978 | Krapfenbauer | .......... B21H 5/02 72/100 |
| 4,178,790 A | * | 12/1979 | Buckley | ................. B21D 53/28 72/224 |
| 2011/0045945 A1 | * | 2/2011 | Buechner | .............. F16D 13/683 475/331 |

FOREIGN PATENT DOCUMENTS

| DE | 19639081 A1 | 4/1998 |
| DE | 10317506 A1 | 11/2004 |

(Continued)

*Primary Examiner* — Jun S Yoo
(74) *Attorney, Agent, or Firm* — Browdy and Neimark, PLLC

(57) ABSTRACT

Method for producing a compound, rotationally symmetrical component (3) with internal and external teeth consisting of a blank (1) and a toothed body (5), wherein the two parts (1, 5) are designed in the form of a pot and in a first method step are inserted coaxially one inside another with interlocking, mutual support and in a second method step are interlocked together with at least one forming tool (17, 27) applied against the (inner and/or outer) circumference, wherein in the second method step the circumferential surface (14, 14') of said blank (1) is continuously deformed in a rolling forming process in the axial direction and in the radial direction such that the circumferential surface (14, 14') of the blank (1) is deformed to interlock into the tooth bases (10) of the teeth (6) of the toothed body (5).

6 Claims, 5 Drawing Sheets

(51) Int. Cl.
*B21D 39/04* (2006.01)
*B21D 53/28* (2006.01)
*B23P 15/14* (2006.01)
*F16D 3/06* (2006.01)
*F16H 57/08* (2006.01)
*F16H 55/06* (2006.01)

(52) U.S. Cl.
CPC ............. *F16D 3/06* (2013.01); *F16H 55/171* (2013.01); *F16H 57/08* (2013.01); *F16D 2250/00* (2013.01); *F16H 2055/065* (2013.01)

(58) Field of Classification Search
CPC .......... B23P 15/14; F16D 3/06; F16D 13/683; F16D 2250/00; F16H 55/17; F16H 55/171; F16H 57/08; F16H 2055/065
See application file for complete search history.

(56) References Cited

FOREIGN PATENT DOCUMENTS

| | | |
|---|---|---|
| DE | 10392665 T5 | 7/2005 |
| DE | 102005056470 A1 | 7/2006 |
| DE | 102006025034 A1 | 11/2007 |
| DE | 102008002297 A1 | 12/2009 |
| DE | 102009044544 A1 | 5/2011 |
| WO | 2009106401 A2 | 9/2009 |
| WO | 2009124534 | 10/2009 |

\* cited by examiner

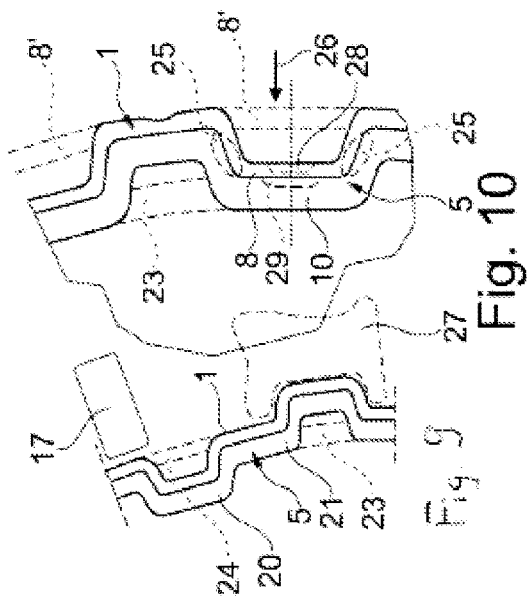
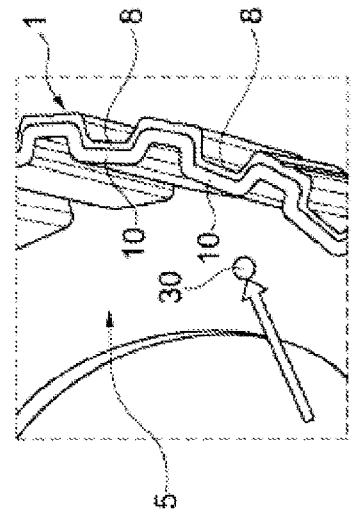
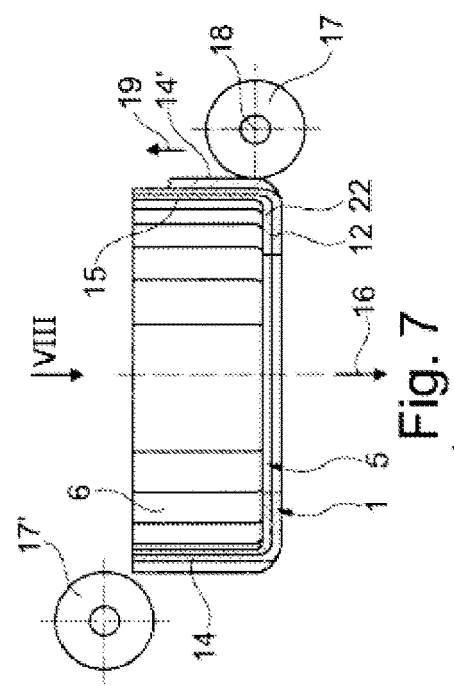
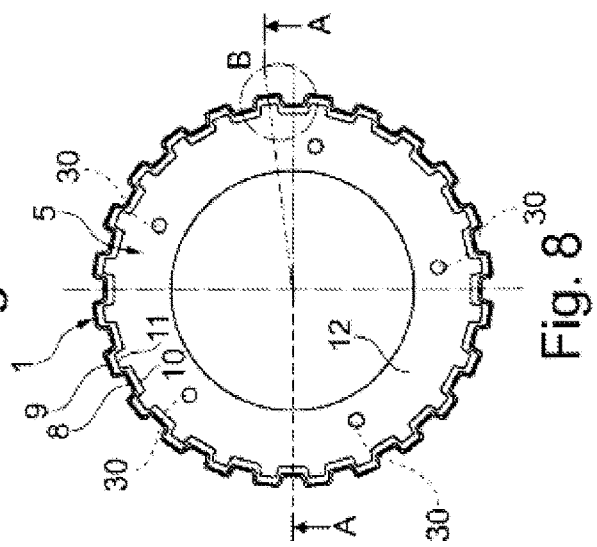

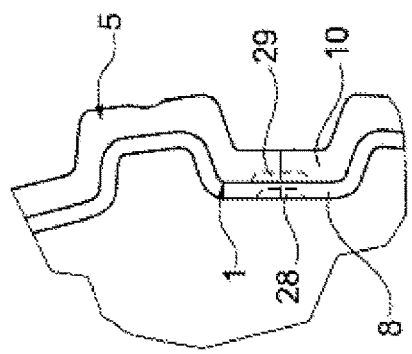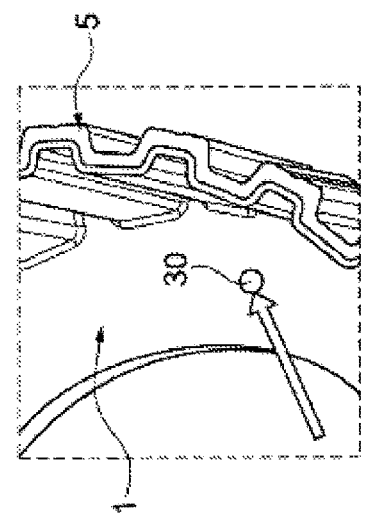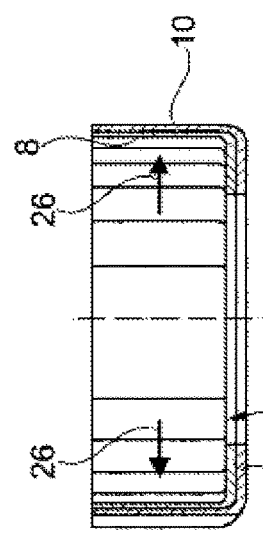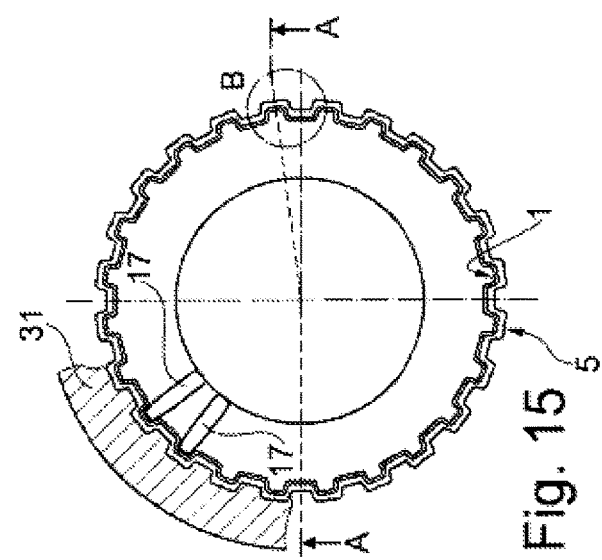

COMPONENT WITH INTERNAL AND EXTERNAL TEETH AND METHOD FOR MANUFACTURING COMPONENT

The invention relates to a compound component with internal and external teeth, as well as to a method for manufacturing the component according to the preamble of claim 1.

Such a component is known from the subject matter of WO 2009/106401 A2. In that arrangement, the compound component has internal and external toothing and is composed of a total of two cup-shaped, nested, rotationally symmetrical, cylindrical parts. Accordingly, the compound component consists of a blank having internal toothing and furthermore of a toothed body having external toothing, the two parts being cup-shaped and coaxially nested such that the toothed body is connected to the blank in a form-fitting manner in the tangential and in the radial direction.

With the manufacture of a compound component comprising at least two [parts] interconnected in the region of their abutting circumferential surfaces, the advantage is achieved that the component consists only on one side—either on the inner or outer side—of a cup-shaped and rotationally symmetrical body that has wear-resistant toothing on that side, and the other side of the compound component—either the outer or inner side—consists of a less wear-resistant, second cup-shaped and rotationally symmetrical component that supports the first component at least in the radial direction. With a component composed in this manner, reduced weight and better dynamic rotational characteristics are achieved in comparison to a component made of homogeneous material.

The connection of the two parts according to the prior art is achieved by putting the outer part, which is provided with appropriate toothing, over an inner part having approximately the same toothing, upon which the mutually associated tooth grooves of the outer and inner part engage in each other in a form-fitting manner. In the unformed state, the tooth groove of the outer part has an arch shape aligned radially inward and is formed by a suitable forming tool in a respective tooth groove of the inner part aligned radially outward. This results in a form-fitting connection of the two parts on the lateral side.

For this purpose, a special forming tool is used that deforms the radially inwardly aligned tooth groove of the outer part, which is arch-shaped in the unformed state, inward, so that the tooth groove deforms into undercuts of the toothing of the inner part and a form-fitting connection formed in the region of the two circumferential surfaces takes places between the two parts. The formation of a tooth groove that is arch-shaped in the unformed state in the toothing of one part is associated with great effort.

The forming tool is embodied as a slider that deforms under deformation of the still undeformed, highly arched tooth base of the toothing of the outer part into the tooth groove of the inner part, thus straightening it.

However, such a deformation slider can only be manufactured at great expense, is complicated to handle, and is subject to a high level of wear. Moreover, it is not always ensured that, during the deformation of the tooth base of the outer part, the latter will be deformed such that it deforms reliably into the undercuts of the tooth base of the inner part. As a result of deviations in materials and manufacturing tolerances, it is possible for no secure connection to occur reliably in the region of the toothing engaging mutually in a form-fitting manner. This is a form-fitting connection achieved without additional connection mechanisms, which can lead to compromises in the strength of the connection as the mechanical and dynamic loads on such a component increase.

It is therefore the object of the invention to further develop a method for manufacturing a compound component of the type mentioned at the outset, and a device, such that the establishing of a connection between the two components in the region of the interlocking tooth grooves is rendered substantially more reliable, resilient and simpler to manufacture.

To achieve the above object, the invention is characterized by the technical teaching of claim 1.

According to the feature of the method, a provision is made according to the invention that a non-toothed or at least partially toothed blank is plugged coaxially onto a toothed body bearing toothing on its circumferential surface, so that, in another method step, the circumferential surface of the blank is deformed in the axial direction with a roll forming process such that the blank is formed in a form-fitting manner into the tooth grooves of the teeth of the toothed body and rests against the tooth grooves of the teeth of the toothed body.

With the teaching provided, the advantage is achieved that the circumferential surface of a blank that is plugged coaxially onto a toothed body is deformed by a roll forming process such that the circumferential surface is formed in the circumferential surface of the blank under the formation of teeth, so that they fit in the teeth of the toothed body in a form-fitting manner and settle there.

In this way, a flawless material connection is established between a blank and the existing teeth of the toothed body.

In a preferred embodiment of the method, a provision is made that the impact extrusion method for mounting the teeth of the blank is set up such that, during molding of the teeth of the blank in the teeth of the toothed body, cold extrusion occurs, whereby the positively interlocking tooth flanks of the blank and the toothing of the toothed body are additionally formed as cold-welded joint surfaces.

Such a compound component made up of at least two toothed parts can be used in the area of drive engineering, transmission technology, and particularly in the area of the mechanical or hydraulic coupling of a land or water vehicle or aircraft engine as disc carriers.

The advantage thus exists that, instead of a one-piece disc carrier composed of a homogeneous material, as is shown in FIG. 2 of the present application as an internal disc carrier, a substantially lower weight and lower rotating masses with lower moment of inertia is now achieved with the compound disc carrier.

Accordingly, the invention constitutes a non-detachable, form-fitting connection between the two cup-shaped components established using roller technology that occurs as a result of cold welding and adhesion during the forming process and, as needed, also as a result of subsequent artificial ageing of the interconnected components.

The invention is not limited to the manufacture of a disc carrier for gearing components. With the invention, it is also possible to manufacture compound toothed belt discs for toothed belt drives or other toothed, rotationally symmetrical components, there being the substantial advantage that—as indicated above—a smaller mass with a lower mass moment of inertia is achieved.

The invention has no restrictions as to the material of which the toothed body is made and—perhaps differing therefrom—the material of which the blank, which is deformed and provided with toothing only subsequently, is made.

In a first embodiment of the invention, a provision is made that the initially non-toothed, cup-shaped blank is made of an easily deformable metal material, such as aluminum, or a suitable aluminum or another light metal alloy, for example.

Stated more generally, the blank is made of a formable material, preferably a metal.

The toothed body in which the toothing is formed is preferably made of a wear-resistant, harder metal material, particularly of such a metal that a cold weld is ensured during the impact extrusion process between the material of the blank and the material of the toothed body in the region of the two mutually abutting and positively interlocking circumferential surfaces.

In a first preferred embodiment, the component assembled from two cup-shaped parts is embodied as an external disc carrier, for example. This means that the outer periphery of the external disc carrier consists of the blank that is rolled with its teeth in the forming process onto the already existing teeth of the toothed body arranged on the inside. In this embodiment, it is crucial that the high-strength teeth of the toothed body be arranged on the inside in the external disc carrier, thus providing the desired high-level wear resistance on the inner circumference of the disc carrier.

In the other embodiment, namely in the embodiment of the component as an internal disc carrier, a provision is made that the blank lying on the outside has a greater strength than the toothed body on the inside.

Here, the high-strength toothing is then arranged on the outer periphery of the compound component, providing a high level of wear resistance in relation to the outer discs.

In the invention, it is thus crucial that high-strength tooth surfaces each be created by a component that is connected in an impact extrusion method to the toothing of another component that is made of another, less wear-resistant material.

Through the combination of two different material pairings for the manufacture of a combined component there is the advantage that low weight is combined in an elegant manner with high wear resistance without the need to use a heavy, continuous, homogeneous component such as that shown in FIG. 2 of the invention as prior art.

If the softer material, which—depending on the design of the disc carrier—forms either the inner or the outer part, were to be omitted, then a lower torque strength would have to be accepted, and only a lesser torque transfer would be possible because the support by the softer component of the component bearing the teeth that are actually wear-resistant is missing.

One example that can be cited is that, in comparing an external disc carrier having a sandwich construction according to the invention with a comparable disc carrier according to the prior art with comparable mechanical characteristics, the disc carrier according to the prior art has at least 30 percent more weight than the combined disc carrier, which is embodied either as an external disc carrier or as an internal disc carrier.

In a combined external disc carrier according to the invention, the less wear-resistant outer part has a preferred material thickness of 3 mm, for example, and the more wear-resistant part forming the inner circumference then only has a thickness of 2 mm. The total thickness is thus 5 mm, and such a compound disc carrier is comparable to a single-part steel disc carrier having a total thickness of 3.2 mm, for instance.

The same relationships exist in an internal disc carrier, with the wear-resistant outer part having a thickness of only 2 mm and the less wear-resistant inner part having a thickness of 3 mm, thus again resulting in a total thickness of 5 mm.

In a development of the invention, a provision can be made that an additional embossment occurs in the region of the mutually abutting circumferential surfaces and/or the mutually abutting front sides of blank and toothed body.

In another embodiment of the invention, a provision can be made that, in addition to the lateral-side embossment, an embossment can also occur in the region of the mutually abutting front sides of the two parts.

The embossments on the circumferential surface and on the front side can be provided either in isolation or in combination with each other.

To achieve the cold-extrusion process strived for on the lateral sides, a provision is thus made that, in a first method step, the unformed blank is placed coaxially onto the outer periphery of the toothed body already bearing teeth, that, in a second method step, the blank formed radially inward on the lateral sides with the aid of radially adjustable press rollers or other roller bodies arranged in a uniformly distributed manner around the periphery, so that the surfaces of the blank are formed into the teeth of the toothed body and the blank is rolled onto the teeth of the toothed body, whereby a mutual inter-forming of the now positively mutually abutting tooth grooves and tooth flanks of the two circumferential surfaces of the two parts occurs during the rolling process, with impact-extrusion regions preferably being embodied in the tooth flank region (side region) in which a cold-welding process takes place.

In this impact-extrusion region, an integral connection of the two materials occurs because an interlocking of the crystalline molecular structures of the two materials occurs during the cold welding that takes place there.

The cold-forming that occurs refers to the forming of metals at a temperature substantially below the recrystallization temperature. The dislocation density in the metal that occurs during the plastic forming leads to an increased likelihood of the mutual dislocations of the two materials meeting during their movement and thus impeding each other in their movement. Accordingly, the materials of the outer and inner part interlock. This also results in cold solidification of the connection after forming has been completed.

Due to the rolling-out process of the circumferential surface of the outside blank onto the teeth of the inside toothed body, a material extension and thinning also occurs in the axial direction of the two parts during the rolling-out of the circumferential surface of the outside blank, which is thus forced in the manner of an impact extrusion process into the teeth of the inside toothed body, which also results in the cold-welding of the blank and of the toothed body.

This results in a flawless material connection between the outside blank and the inside toothed body.

The invention is not limited to the fact that the rolling process takes place from the outside blank in the direction radially inward onto the inside toothed body. This exemplary embodiment assumes that suitable rollers or pressure rollers begin at the outer periphery of the blank and roll its circumferential surface radially inward into the region of the teeth of the toothed body.

In a kinematic reversal of this idea, a provision is made that the rolling process takes place from the inside outward. This presupposes suitable roll or roller bodies on the interior that execute the radially outwardly oriented forming process.

The inventive subject matter of the present invention follows not only from the subject matter of the individual claims, but rather also from the combination of the individual claims with one another.

All of the information and features disclosed in the documents, including the abstract, and particularly the spatial embodiment depicted in the drawings, are claimed as being essential to the invention insofar as they are novel in view of the prior art individually or in combination.

The invention is explained in further detail below with reference to drawings illustrating several possible embodiments. Additional features and advantages of the invention that are essential to the invention follow from the drawings and their description.

FIG. 7 shows the schematized representation of the rolling-out process, in which the blank is rolled onto the inside toothed body with the aid of a set of rollers;

FIG. 8 shows the view in arrow direction VIII of the representation according to FIG. 7;

FIG. 9 shows a schematic, enlarged section through the two interlocking parts in two different embodiments, each with an internal or an external tooth;

FIG. 10 shows an enlarged partial section through the two interlocking parts in the unformed state and in the formed state;

FIG. 11 shows a perspective, enlarged internal view of the interlocking of the two parts;

FIG. 14 shows an embodiment that has been modified from that of FIG. 7 in which the rolling-out occurs from the inside;

FIG. 15 shows the tool set for the rolling-out process according to FIG. 14;

FIG. 16 shows the enlarged partial section through the connection according to FIG. 15 between the two components;

FIG. 17 shows the tooth engagement of the two components 1, 5 interconnected in the impact extrusion process.

The invention relates to the rolling-out of a blank 1 which, as a cup-shaped component in a first embodiment of the invention, does not yet bear teeth in the first method step. The blank 1 is rolled onto a toothed body 5 bearing complete toothing 6, so that the blank 1 takes over its toothing, and the two teeth 4, 6 interlock in a form-fitting manner and are interconnected in the region of their tooth flanks in the cold-welding method.

Figure 1:
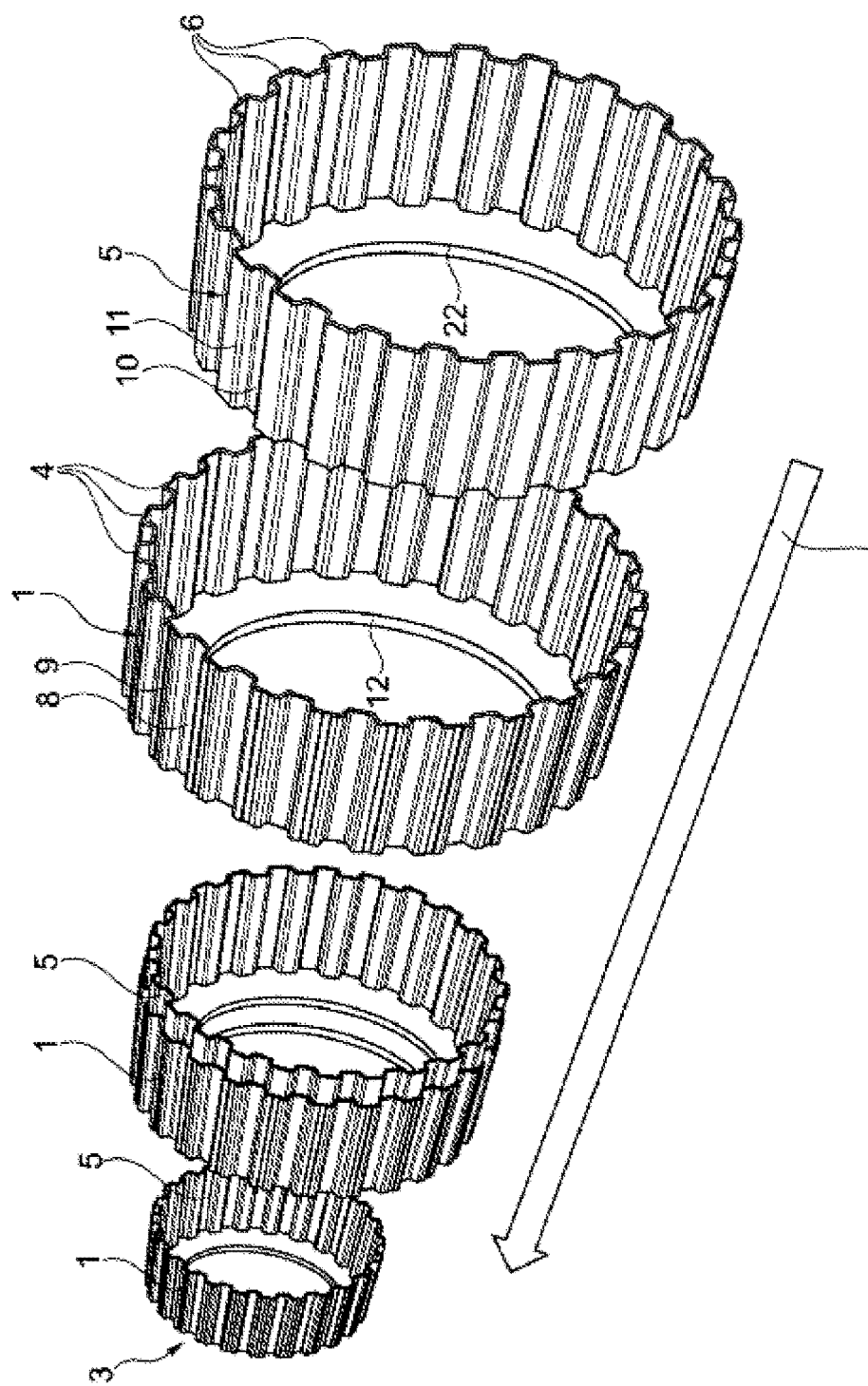
FIG. 1 shows a stepwise representation of the interlocking of two parts that form a compound component in the last method step (left)

FIG. 1 shows a schematic representation of a first toothed body 5 having toothing 6 that consists of periodically alternating tooth grooves 10 and tooth flanks 11.

The toothed body 5 also has a front wall 22 in which a central recess is arranged.

FIG. 1 shows, from left to right, the stepwise production in arrow direction 2. The toothed body 5 is first inserted into the interior of a blank 1.

The representation in FIG. 1 shows, in a first embodiment, that the blank 1 is already equipped with complete toothing 4 that consists of periodically alternating tooth grooves 8 and tooth flanks 9.

The toothing 4 should conform as closely as possible to the toothing 6 in the toothed body 5, although the invention is not limited to this. A provision can also be made that the toothing 4 of the blank 1 deviates from the toothing 6 of the toothed body 5, for example by omitting every other second tooth groove and tooth flank of the blank 1, for example, and embodying it as a continuous web 23, 24.

In a second embodiment, a provision is made that the blank 1 does not have any toothing at all in the first method step to the left in FIG. 1 and is merely embodied as a non-toothed cup-shaped component that only receives its toothing through the rolling process to be described later.

Accordingly, FIG. 1 shows only the first embodiment of the blank 1 (which is toothed from the outset) with complete toothing 4, it not being shown in the drawing that the toothing of the blank 1 can also be omitted and applied only during the subsequent rolling process.

The blank 5 further comprises an inner front wall 12 that is bounded by a central recess.

The two front walls 12, 22, which then rest against each other in the compound component 3, can also be continuously connected, in which case the central recess is omitted.

As the manufacturing progresses, the blank 1 is thus placed onto the outer periphery of the toothed body 5, thus resulting in the second position from the left in FIG. 1. This is an intermediate position. This illustration shows only for the sake of better graphic clarification that the two components are not yet nested, and the placement process is then finally completed in FIG. 1 on the left side.

In the assembled state, the blank 1 is thus rolled with its wall onto the circumferential surface of the inside toothed body using a roll or roller tool that rests in a uniformly distributed manner on the periphery of the blank 1, thus resulting in two positively interlocking teeth 4, 6 that still exhibit additional cold-welded regions in the region of their tooth flanks. This is shown in FIG. 1 in the far-right position.

The representation in FIGS. 2 to 6 shows additional details.

Figure 2:
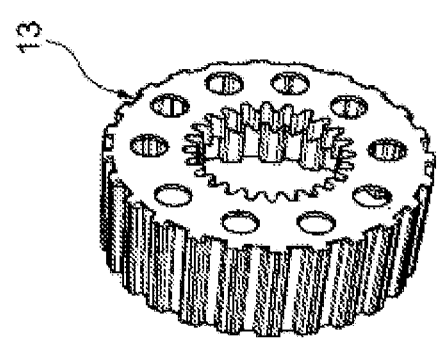
FIG. 2 shows an internal disc carrier according to the prior art made of a homogeneous, continuous steel sheet.

FIG. 2 shows an internal disc carrier 13 as a component according to the prior art. It is made of a homogeneous, continuous steel sheet material and must be embodied with a substantially greater thickness and greater strength than the combined component 3 according to FIG. 1 in order to achieve the same mechanical characteristics.

Figure 3:
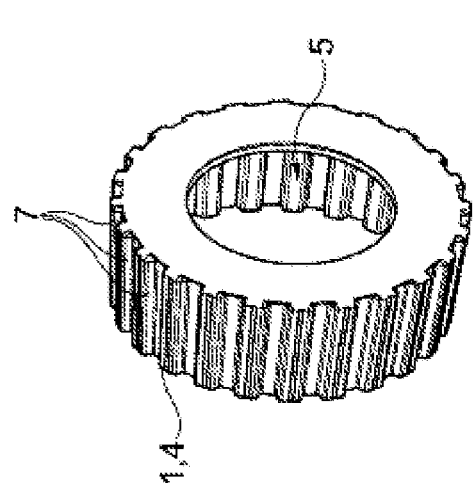
FIG. 3 shows a perspective view of an external disc carrier in the completed state with a toothed body forming the outer periphery and a blank forming the inner circumference.
Figure 4:
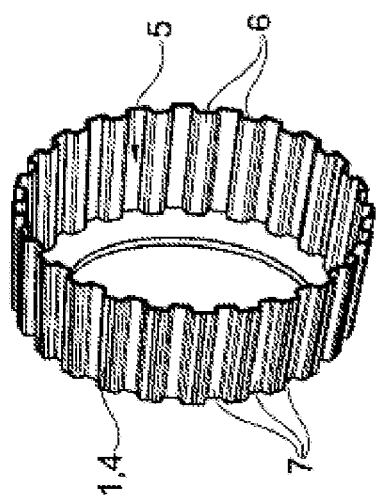
FIG. 4 shows the same view according to FIG. 3 from the other side.

The combined component 3 according to FIG. 1 can be used in two different embodiments. FIGS. 3 and 4 show the embodiment of the component 3 as an external disc carrier, whereas FIGS. 5 and 6 show the embodiment of this combined component 3 as an internal disc carrier.

In FIGS. 3 and 4, the highly wear-resistant toothed body 5 is thus arranged on the inner circumference of the combined component 3 and forms a highly wear-resistant toothing 6. The outer periphery of the combined component is formed by the softer blank 1, whose toothing 4 is rolled onto the external tooth of the toothed body 5 and forms the lateral-side connecting regions 7 in these regions.

Figure 5:
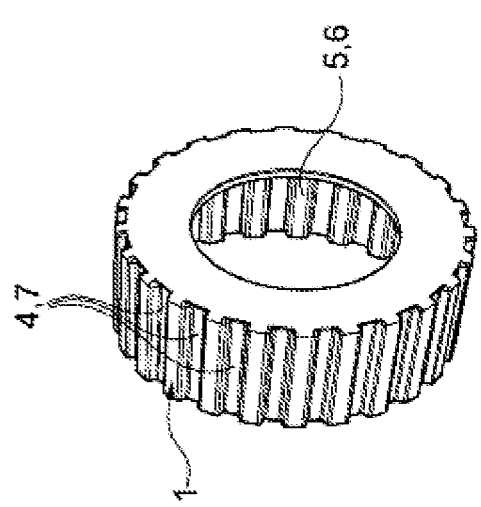
FIG. 5 shows a perspective representation of an internal disc carrier in which the blank is on the outside and the less wear-resistant toothed body is on the inside.
Figure 6:
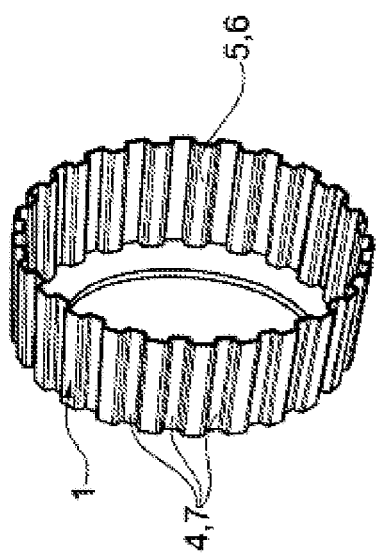
FIG. 6 shows the same representation as FIG. 5 from the other side.

Another type is shown in FIGS. 5 and 6, where the highly wear-resistant blank 1 forms the outer periphery of the combined component 3 with its toothing 4, whereas the less wear-resistant toothed body 5 is arranged on the inner circumference of this component 3.

Figure 13:
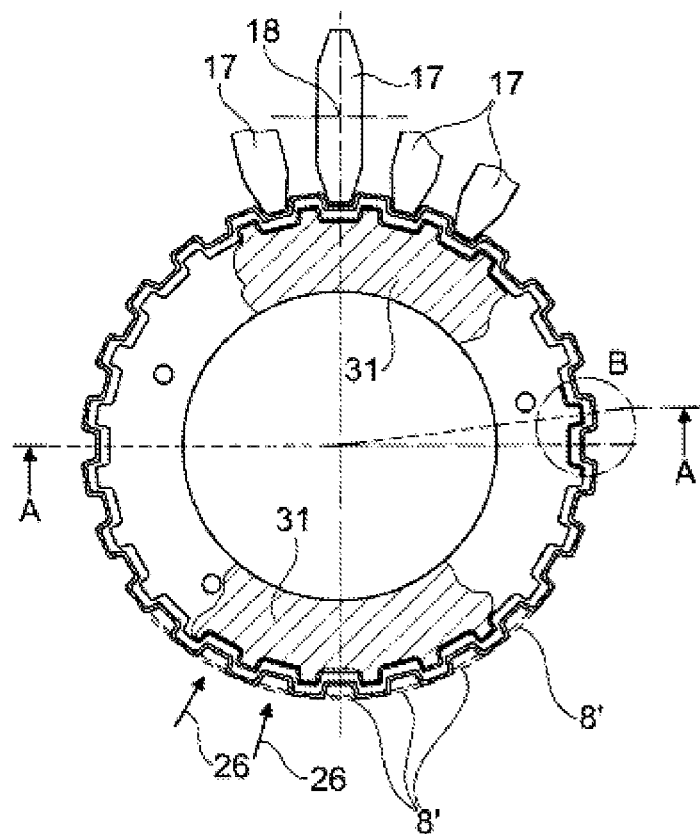
FIG. 13 shows a top view of the tool set for establishing the connection according to FIGS. 7 and 12.

FIG. 7 shows, as a first embodiment, that the blank 1 is placed as a cup-shaped part onto the outer periphery of one toothed body 5 having toothing 6 and rests on the outer periphery against a number of rollers 17, each rotating in a pivot bearing 18, with each roller—see FIG. 13—rolling out the circumferential surface in arrow direction 19 such that an increase in length and thinning of material occurs and the circumferential surface 14 of the blank 1 is rolled into the toothing of the toothed body 5.

The circumferential surface 14 is thus extended in the axial direction, because a cold-extrusion process takes place. The final position is shown on the left side in FIG. 7.

In the depicted exemplary embodiment, the set of rollers with the rollers 17 remains stationary, and the entire component is moved downward in arrow direction 16 in the axial direction, so that the rollers 17 of the set of rollers move along the circumferential surface 14' and roll them out until the final state according to FIG. 7 on the left side is reached. The roller 17 is then located in the position of the roller 17', and the circumferential surface 14' is rolled out completely in its length and is about flush with its front side, for example, with the circumferential surface 15 of the toothed body 5.

In the completed state, one obtains the front view according to FIG. 8. It can be seen that the tooth grooves and tooth flanks 10, 11 of the toothed body 5 are formed in a form-fitting manner into the tooth grooves and tooth flanks 8, 9 of the blank 1 and form cold-extrusion connection regions there.

FIG. 9 shows two different exemplary embodiments in which it is shown that such a connection can take place both with an external tooth 21 between the two parts and also with an internal tooth 20 as shown in the upper part of FIG. 9.

In the case of an internal tooth 20 (upper part of FIG. 9), the roller 17 abuts from the outside and deforms the mutually abutting flanks radially inward, whereas in the case of an external tooth 21 according to FIG. 9 (lower part), a suitable roller 17 or other roller body deforms the tooth flanks.

A roller 27 is used here which has an approximately trapezoidal profile according to FIG. 9 (lower illustration).

From that, it follows that both internal and external teeth 20, 21 can be positively interconnected by cold-welding using the method.

FIG. 9 also shows that it is not necessary to the solution that every tooth groove 8 and associated tooth flank 9 arranged on the periphery each be formed in a tooth groove 10 and an associated tooth flank 11. It is possible, for example, for only every other or third or every fifth tooth groove and tooth flank 8, 9 to be connected to an associated tooth groove and tooth flank 10, 11 in the cold-extrusion method. This is illustrated in FIG. 9 such that, if no deformation takes place, undeformed webs 23, 24 are present that are then not deformed.

FIG. 10 shows the interconnected teeth. It can be seen that the tooth groove 8 is initially straight in the unformed state and forms a straight tooth groove region 8', which is thus deformed radially inwardly by the roller 17 in arrow direction 26 and deformed into the tooth groove 10 of the toothing of the toothed body 5. This results in impact-extrusion regions 25 on the side surfaces of the mutually abutting tooth flanks 9 and 11 in which a cold-welding process takes place, whereby a material connection of the two materials occurs in these regions, thus ensuring an especially strong, substance-to-substance and form-fitting connection.

To additionally secure this connection, a provision can be made in a development of the invention that mutually associated impressions 28, 29 are provided in the region of the tooth groove (tooth base) 8 and the opposing tooth groove 10 that interlock and bring about another form-fitting connection in the region of the mutually abutting tooth grooves 8, 10.

In addition, and in combination therewith or also in isolation, a provision can be made that impressions 30 are present in the region of the mutually abutting front walls 12, of the components 1, 5 that interlock in a form-fitting manner. This is illustrated in FIG. 11.

Figure 12:
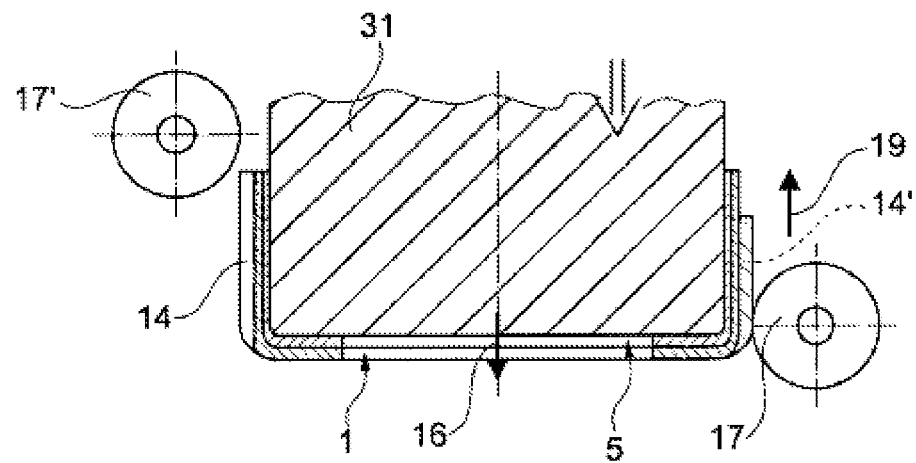
FIG. 12 shows a representation of the tool set as used to establish a connection according to FIG. 7.

FIGS. 12 and 13 show the mechanical design of the embodiment according to FIGS. 7 and 8. It can be seen there that a toothed component receptacle 31 engages in the interior of the toothed body 5 that bears on its outer periphery the same toothing as the toothed body 5, so that the toothing of the component receptacle 31 engages in a flush manner in the toothing of the toothed body 5 and supports same from the inside.

The initially non-toothed (or also possibly toothed) blank 1 rests against the outer side of the toothing 6 whose circumferential surface 14 is first rolled out of the position 14' into the completed circumferential surface 14, as can be seen from the right side of the illustration in FIG. 12 on the left side in FIG. 12.

FIG. 13 shows the partially top view of the representation according to FIG. 12. The toothed component receptacle 31 is partially illustrated only for the sake of graphic clarity. In reality, it runs continuously around it and fills out the entire inner circumference of the toothed body 5.

The invention is not reliant on the toothed component receptacle 31 abutting at all points of the periphery in a form-fitting manner against the toothing 6 of the toothed body 5.

It is also shown only in part that the rollers 17 are uniformly arranged on the periphery. However, it is not essential to the solution for a tooth engagement to also be associated with every roller. Different tooth engagements can also be present without a roller, so that, just as an example, every second or every third tooth engagement is also rolled out with the aid of an associated roller 17, 17'.

FIGS. 14 to 17 show as a modified exemplary embodiment that the deformation can also occur so as to be aligned radially outward in arrow direction 26. In this case, a deformation would occur in the direction toward the outer periphery of the blank 1 starting from the inside blank 1. The toothed component receptacle 31 then rests according to FIG. 15 against the outer periphery of the toothed body 5 and supports same radially outward, whereas the rollers 17 that roll the toothing of the blank 1 into the toothing of the toothed body 5 rest against the inner circumference of the blank 1.

Here, too, a provision is made in both exemplary embodiments that either the cup-shaped blank 1 is either smooth and non-toothed and the toothing is rolled in only subsequently by the rollers 17 or—in the second embodiment—that the blank 1 already bears the toothing 4 and the already completed toothing is rolled out with the rollers 17, so that the toothing 4 is connected in a form-fitting and substance-tosubstance manner to the toothing 6 of the toothed body 5 through the impact extrusion process.

Here as well, it is shown in FIG. 16 that, in order to further secure the impact-extruded connection, positively interlocking impressions 28, 29 can additionally be provided in the region of one or more of the mutually abutting tooth grooves 8, 10.

FIG. 17 shows the tooth engagement of the two components 1, 5 interconnected in the impact extrusion process, it being possible for additional positively interlocking impressions 30 to be present in the region of the mutually abutting front walls 12, 22 for the purpose of further securing the connection.

In the above description, a method for manufacturing a compound, rotationally symmetrical component 3 with internal and external teeth consisting of a blank 1 having an internal tooth 4 and a toothed body 5 having an external tooth 6 was discussed, the two parts 1, 5 being cup-shaped and coaxially nested in a first method step under form-fitting, mutual support, and positively interconnected in a second method step with at least one forming tool 17, 27 resting against the (interior and/or exterior) periphery.

However, the invention is not limited to a blank 1 having an internal tooth 4. Rather, in another embodiment, the cup-shaped blank can be completely smooth and only be given the desired tooth shape through the roll forming.

The same applies to the inner part referred to as a toothed body 5. Here, it is also not necessary for the toothed body 5 to be toothed. It can be embodied as a completely smooth cup-shaped part and be supported on its inner circumference by a toothed body acting as a matrix. In this embodiment, the tooth shape of the inner part (also referred to in limiting fashion as a toothed body 5) is only achieved during roll forming. The roll tools resting against the outer periphery of the (toothed or smooth) blank 1 then roll the tooth profile through the blank 1 and the inner (non-toothed) toothed body 5 in the direction toward the inner toothed matrix. In this embodiment, all of the combinations between a toothed or non-toothed blank 1 and a toothed or non-toothed toothed body 5 are claimed as being essential to the invention.

With this technology, it is possible to achieve a substantial weight reduction with simultaneous functionality within a transmission or in the area of drive engineering, which is associated with substantial advantages in terms of fuel economy in passenger cars and freight vehicles.

LIST OF REFERENCE SYMBOLS 1 blank
2 arrow direction
3 component (toothed)
4 toothing (of 1)
5 toothed body
6 toothing (of 5)
7 connecting region
8 tooth groove (of 1) 8'
9 tooth flank (of 1)
10 tooth groove (of 5)
11 tooth flank (of 5)
12 front wall (of 1)
13 component (prior art)
14 circumferential surface (of 1) 14'
15 circumferential surface (of 5)
16 arrow direction
17 roller 17'
18 pivot bearing
19 arrow direction
20 internal tooth
21 external tooth
22 front wall (of 5)
23 web
24 web
25 impact-extrusion region
26 arrow direction (impact-extrusion region)
27 roller
28 impression (circumferential surface)
29 impression (circumferential surface)
30 impression (front wall)
31 toothed component receptacle

The invention claimed is:

1. A method for manufacturing a compound, rotationally symmetrical component with internal and external teeth consisting of a blank having the internal teeth and a toothed body having the external teeth that interlock with the internal teeth, wherein the blank and the toothed body are cup-shaped and nested coaxially in a first method step under form-fitting, mutual support and positively interconnected in a second method step with at least one forming tool resting against an inner or outer periphery, comprising deforming a circumferential surface of the blank continuously in an axial direction and in a radial direction with a roll forming process such that the circumferential surface of the blank is deformed in a form-fitting manner into tooth grooves of toothing of the toothed body.

2. The method as set forth in claim 1, wherein the circumferential surface of the blank is formed in an impact extrusion process in the circumferential surface of the toothed body under formation of the toothing.

3. The method as set forth in claim 2, wherein the impact extrusion method for producing toothing of the blank is embodied as a cold-extrusion method, so that positively interlocking tooth flanks of the blank and tooth flanks of the toothed body form cold-welded joint surfaces at least in part.

4. The method as set forth in claim 1, wherein an additional embossment is executed in a region of at least one of mutually abutting circumferential surfaces and mutually abutting front sides of the blank and the toothed body.

5. The method as set forth in claim 1, wherein, in a first method step, an undeformed blank is placed coaxially onto the outer periphery of the toothed body already bearing the toothing in the second method step, the blank is deformed radially inward on the lateral side by radially advanceable press rollers or roller bodies arranged in a uniformly distributed manner on a periphery of the blank, so that surfaces of the blank are deformed into the toothing of the toothed body, and the blank is rolled onto the toothing of the toothed body.

6. The method as set forth in claim 1, wherein, during the roll forming process, a mutual inter-forming of positively mutually abutting tooth grooves and tooth flanks of the two circumferential surfaces of the two blank and the toothed body occurs, and impact-extrusion regions are preferably formed in the region of the tooth flanks in which a cold-welding process takes place.

* * * * *